United States Patent [19]

Obitsu et al.

[11] Patent Number: 4,521,249

[45] Date of Patent: Jun. 4, 1985

[54] SILICATE CONTAINING AGENT AND CEMENT SURFACE MODIFIED WITH SAID AGENT

[75] Inventors: Masamichi Obitsu, Chiba; Takahiro Hori, Funabashi; Toyoji Koinuma, Tokyo; Yuriko Sakaguchi, Funabashi, all of Japan

[73] Assignee: Nissan Chemical Industries, Ltd., Tokyo, Japan

[21] Appl. No.: 567,028

[22] Filed: Dec. 30, 1983

Related U.S. Application Data

[62] Division of Ser. No. 400,820, Jul. 22, 1982, Pat. No. 4,443,496.

[30] Foreign Application Priority Data

Jul. 30, 1981 [JP] Japan ................................. 56-119751

[51] Int. Cl.$^3$ .............................................. C04B 31/00
[52] U.S. Cl. .................................. 106/12; 106/287.24; 106/287.34; 427/140
[58] Field of Search ................... 106/12, 38.35, 287.12, 106/287.24

[56] References Cited

U.S. PATENT DOCUMENTS

| 2,709,661 | 5/1955 | Dietz | 106/100 |
| 4,006,030 | 2/1977 | Yoshida et al. | 106/12 |
| 4,345,944 | 8/1982 | Kazama et al. | 106/90 |
| 4,443,496 | 4/1984 | Obitsu | 427/140 |

Primary Examiner—Theodore Morris
Attorney, Agent, or Firm—Jordan and Hamburg

[57] ABSTRACT

An agent and method for modifying a surface layer of hardened cement structures or substrates with use of the agent which comprises in a specified ratio of an alkali silicate solution and a sodium naphthalenesulfonate-formaldehyde condensate. Said agent has an excellent stability and a remarkable permeability into the cement structure to form a deeper strengthened surface layer thereon.

11 Claims, No Drawings

SILICATE CONTAINING AGENT AND CEMENT SURFACE MODIFIED WITH SAID AGENT

This is a division of application Ser. No. 400,820, filed July 22, 1982 now U.S. Pat. No. 4,443,496 issued Apr. 17, 1984.

The present invention relates to an improvement in or relating to an agent and a method for modifying a surface layer of hardened cement structures or substrates (herein referred to as "cement structure").

Cement materials such as cement, mortar, concrete, calcium silicate and the like have widely been used in various fields. The structure made from such material, however, has innumerable fine bores communicating with its outer surface, and thus various alien matters inevitably penetrate into such bores so that the surface layer is to be deteriorated with the lapse of years, which is particularly considerable as to the outdoor structures.

In order to prevent such a deterioration, a method has been proposed wherein to impregnate the cement structure with silica sol containing a silica component, an ammonium component and an alkali metal component in a specified mole ratio (Japanese Examined Patent Application Gazette No. 19 609/1978). This method has been confirmed useful and actually carried out to some extent. It is, however, unsatisfactory in that the agent often cannot sufficiently penetrate into bores of the structure so that the depth of the improved layer for preventing deterioration is not insufficient depending on its components, preparation method, curing method, deterioration degree and other factors.

It has also been proposed to use an aqueous solution of lithium silicate (Japanese Examined Patent Application Gazette No. 30 658/1975) but this is still unsatisfactory by the same reason.

When shock or tension is affected on the surface of cement structure, a thin modified surface layer is sometimes damaged to expose the non-modified layer. Therefore, it is desirous to form the modified surface layer as deep as possible on the hardened structure.

In order to elucidate mechanism of formation of modified layer, the present inventors have made experiments on the aforesaid methods in accordance with disclosures given in said Japanese Examined Patent Application Gazettes to find that when sodium toluensulfonate, polyoxyethylenenonylphenol ether, sulfonated melamine-formaldehyde condensate or the like commercially available surfactant is added to the silica sol or lithium silicate solution, the stability of the agent thus obtained is inferior and gelation is often caused, whereby a permeation of the agent into deeper area of the structure is not attained.

The inventors have studied on the properties of agents obtained by various combinations of surfactants and silica sol or silicate solution, and finally found that an agent comprising an alkali silicate solution and a sodium naphthalenesulfonate-formaldehyde condensate, is remarkably stable over an extended period of time and has an excellent permeability into the hardened cement structures when applied on the surfaces thereof.

An object of the present invention is, thus, to provide an agent for modifying the surface layer of hardened cement structures, which is improved in the stability and permeability so as to satisfactorily prevent deterioration thereof.

Another object of the invention is to provide a method for modifying the surface layer of hardened cement structures over a sufficient depth by applying the agent.

A still other object of the invention is to provide a method for repairing the deteriorated surface layer of cement structures, by applying the agent on the deteriorated surface of the structure, drying the treated structure, applying a freshly prepared cement material on the treated surface of said structure, and then curing the applied cement material.

According to the invention, the agent comprises 100 parts by weight of an alkali silicate solution and 0.01 to 5 parts by weight of a condensate of sodium naphthalenesulfonate and formaldehyde, in which said alkali silicate solution has a $SiO_2/M_2O$ mole ratio of 1 to 50, wherein M represents an alkali metal atom, or a substituted or unsubstituted ammonium cationic radical, and has a $SiO_2$ content of 1 to 50 weight %.

Further, according to the invention, a modified surface layer is formed on a cement structure over a sufficient depth by a method of applying on and impregnating into the surface of said structure with said agent, and then leaving to stand or positively drying the thus treated structure.

Still further, according to the invention, repairing of a deteriorated surface layer of cement structure is attained by a method of further applying a freshly prepared cement material on said dried surface, and then curing the applied cement material.

The term, "alkali silicate solution" to be used in the specification and claims designates an aqueous solution of one or more alkali silicates or a liquid wherein stably dispersed fine particles of colloidal silica shall partially co-exist with said dissolved silicates.

A mixture of water with a water soluble organic solvent may also be used as the medium of the solution. Among the alkali silicates, there may be mentioned alkali metal silicates such as lithium silicate, potassium silicate, sodium silicate, cesium silicate or the like, and substituted or unsubstituted ammonium silicates. There may be listed, as examples of substituted or unsubstituted ammoniums, $NH_4$, $CH_3NH_3$, $(CH_3)_2NH_2$, $(CH_3)_2(C_2H_4OH)_2N$, $(C_2H_4OH)_4N$, $(C_2H_4OH)_3NH$, $(C_2H_5)_2NH_2$, $(C_2H_5)(C_3H_6OH)NH_2$, $(C_2H_5)(C_2H_4OH)_3N$ and the like. Hydroxides of these substituted or unsubstituted ammoniums are usually strong alkaline substances, and easily form silicates when reacted with silicic acid or colloidal silica. The examples of silicates of these substituted ammoniums are silicates of methylammonium, dimethylammonium, dimethyldiethanolammonium, triethanolammonium, tetraethanolammonium, diethylammonium, ethylpropanolammonium and ethyltriethanolammonium. Such silicates may be used solely or in the form of a mixture.

An alkali silicate solution with a $Si_2O/M_2O$ mole ratio of less than 1 does not sufficiently modify the surface layer of the cement structure from the practical view point. An alkali silicate solution with a $SiO_2/M_2O$ mole ratio of more than 50 does not show a sufficient permeability into the structure, due to too high content of colloidal silica in the agent.

An alkali silicate solution of a $SiO_2$ content less than 1 weight % does not sufficiently increase the strength of cement structure surface layer when applied on it, and an alkali silicate solution of a $SiO_2$ content more than 50 weight % is not satisfactory in its stability and often causes gelation. Even if such defects would not be observed, such solution of too high concentration makes the quality of the resulting modified layer uneven. A preferable $SiO_2$ content of the alkali silicate solution lies in the range of from 5 to 30 weight %.

The alkali silicate solution with the $SiO_2/M_2O$ mole ratio of 1 to about 4 can be prepared by dissolving an alkali silicate in water or by adding an alkali to form said salt in colloidal silica dispersion and if necessary heating. The alkali silicate solution with the $SiO_2/M_2O$ mole ratio of higher than 4 is a liquid wherein colloidal silica co-exists in a dispersion state. Such alkali silicate solution with a higher mole ratio can be prepared by adding an alkali silicate or alkali hydroxide into a colloidal silica dispersion and if necessary heating, or dealkalizing an alkali silicate solution according to a cation exchange method or the like and if necessary adding an alkali to form said salt to stabilize the dispersion. Colloidal silica of smaller particle size is preferable for the alkali silicate solution with the $SiO_2/M_2O$ mole ratio of higher than 4, particularly higher than 7. The particle size is preferably less than 50 μm and more preferably less than 20 μm. According to the invention, it is preferable to use a lithium silicate solution with a $SiO_2/M_2O$ mole ratio of 2 to 7 and a low colloidal silica content.

The sodium naphthalenesulfonate-formaldehyde condensate used for the invention is a polymer usually represented by formula

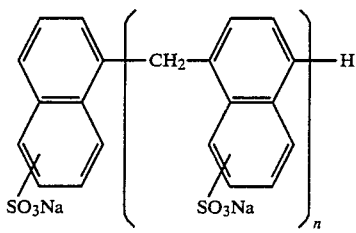

wherein n is an integral of 1 to 100. Such a condensate is easily and commercially available. Usually an aqueous solution of the condensate however tends to increase in its viscosity with an increase in the degree of polymerization of the condensate. It is preferable for the preparation of an agent having high stability and permeability according to the invention that the condensate has a polymerization degree ranging from 3 to 50. As aforesaid, the agent according to the invention comprises 100 parts by weight of said alkali silicate solution and 0.01 to 5 parts by weight of such condensate. The agent having the condensate content of less than 0.01 part by weight has not an excellent permeability into the cement structure. The agent having the condensate content of more than 5 parts by weight is of a low stability, and the viscosity of the agent is increased with lapse of time and gelation is often caused. Preferable content of the condensate ranges from 0.02 to 1 part by weight.

The agent of the invention can easily be prepared by mixing the alkali silicate solution with the condensate in said ratio and then homogenizing the same. The agent may comprise coloring agent, stabilizer, viscosity regulating agent and any of other components, in addition to said two indispensable components. The agent may be used as a paint by adding paint components thereto to form a decorated surface on the cement structures.

The agent may be applied to any of hardened cement structures such as a hardened cement structure, hardened mortar structure, hardened concrete structure, calcium silicate board and the like. The structure may be of any configuration. The agent can be applied also to a deteriorated cement structure such as the wall of concrete structure and mortar wall and, deteriorated cement products, such as a concrete surface which was formed by insufficient curing due to a dry out, freezing or penetration of lignin, or a concrete surface which has been deteriorated by weathering or fire.

The agent may be permeated into the cement structure from its outer surface with use of any conventional method, for instance by brushing, rolling, spraying or the like, or by soaking. The treated cement structure is then left to stand in air or positively dried to form modified surface layer over a sufficient depth. The modified surface layer has a compacted structure, increased strength and hardness, as well as an excellent resistance to water and weathering. Even if a shock is affected on the modified surface to cause a certain damage thereon, a non-modified layer would not so readily be exposed, since the modified layer has a sufficient thickness. Further, if necessary, a protective paint may be applied on the modified surface to obtain a cement structure with a decorative or protective surface. Moreover, a cement, mortar or concrete structure with a surface deteriorated by weathering or fire can be repaired by applying the agent on the deteriorated surface to impregnate the same with said agent, leaving to stand in air or positively drying the treated surface, applying thereon a freshly prepared cement paste, mortar or concrete and curing the same. According to this method, the freshly formed cement material layer firmly binds on the strengthened modified layer. On the contrary, the conventional modifying agent can not provide a modified layer over a sufficient thickness and with a sufficient strength and thus such an accident can not be avoided that an inner un-modified layer is damaged by a shock against an outer surface to cause a peeling off of the freshly formed cement material layer attached by a thin already modified layer.

It has not sufficiently been elucidated why the agent according to the invention can permeate from an outer surface of the cement structure into deeper area thereof, but shall be estimated as follows. In accordance with the prior art processes, a free calcium content in the hardened cement structure contacts with an alkali silicate solution entering into the structure through fine bores thereof to cause a gelation, so that deeper permeation of the alkali silicate solution is prevented. While in accordance with the invention, said free calcium is catched by the co-existing condensate of sodium naphthalenesulfonate and formaldehyde and thus the viscosity increase or gelation of the alkali silicate solution can be avoided to allow permeation of the silicate solution into deeper area of said structure. It was surprised, however, that the agent according to the invention and comprising the alkali silicate solution and the condensate shows an excellent stability and permeability, since water soluble compounds with sulfonic acid radical other than said condensate, for instance sodium alkylbenzenesulfonate, sulfonated melamine-formaldehyde condensate and the like increase viscosity of the alkali silicate solution or make same unstable to show no desired effect.

The invention will now be further explained in detail, with reference to Examples and Comparative Examples.

EXAMPLES 1 TO 4

In each 1000 g aqueous solution of lithium silicate, sodium silicate, potassium silicate and tetraethanolammonium silicate having $SiO_2/M_2O$ mole ratio of 3.5 and $SiO_2$ content of 10 weight %, lg of 30% aqueous solution of sodium naphthalenesulfonate-formaldehyde condensate having degree of polymerization of 10 was added and then stirred to prepare 4 agents according to the invention. Each of the agents was sealingly stored at 40° C. for 6 months to find that each agent remains in stable state and shows neither viscosity increase nor isolation.

Mortar blocks with a cement/sand ratio of ⅓ and size of 4×4×16 cm were left to stand in a carbon dioxide atmosphere to neutralize the same. Each of the resulting blocks was soaked in each of said agent solutions for 1 hour, picked up and then dried in air at room temperature for 1 day. Each of the treated blocks was chopped and a solution of phenolphthalein was blown on the chopped surface to give a colour mark to the area where the agent was permeated and measure the permeated depth. Results are shown in following Table 1.

COMPARATIVE EXAMPLES 1 TO 4

Tests similar to those in Examples 1 to 4 were carried out, excepting that the condensate of sodium naphthalenesulfonate-formaldehyde is not added to each agent. Results are shown in following Table 1.

EXAMPLES 5 TO 8

Tests similar to those in Examples 1 to 4 were carries out, excepting that calcium silicate boards, each having a specific gravity of 0.8 and a size of 2×4×4 cm were used as the cement structures in lieu of the mortar blocks. Results are shown in following Table 1.

COMPARATIVE EXAMPLES 5 TO 8

Tests similar to those in Comparative Examples 1 to 4 were carried out, excepting that calcium silicate boards as employed in Examples 5 to 8 were used in lieu of the mortar blocks. Results are shown in following Table 1.

TABLE 1

| | Alkali silicate in Agent | Cement Material | Permeated depth (mm) |
|---|---|---|---|
| Example | | | |
| 1 | lithium silicate | mortar block | 5 |
| 2 | sodium silicate | mortar block | 3 |
| 3 | potassium silicate | mortar block | 2 |
| 4 | tetraethanol-ammonium silicate | mortar block | 2 |
| 5 | lithium silicate | calcium silicate board | 20 |
| 6 | sodium silicate | calcium silicate board | 20 |
| 7 | potassium silicate | calcium silicate board | 10 |
| 8 | tetraethanol-ammonium silicate | calcium silicate board | 10 |
| Comparative Example | | | |
| 1 | lithium silicate | mortar block | 2 |
| 2 | sodium silicate | mortar block | 1 |
| 3 | potassium silicate | mortar block | 1 |
| 4 | tetraethanol-ammonium silicate | mortar block | 1 |
| 5 | lithium silicate | calcium silicate board | 5 |
| 6 | sodium silicate | calcium silicate board | 3 |
| 7 | potassium silicate | calcium silicate board | 2 |
| 8 | tetraethanol-ammonium silicate | calcium silicate board | 2 |

EXAMPLE 9

In 1000 g aqueous solution of lithium silicate having $SiO_2/M_2O$ mole ratio of 3.0 and $SiO_2$ content of 10 weight %, 3 g of the sodium naphthalenesulfonateformaldehyde condensate same with that as used for Examples 1 to 4 were added and the resulting mixture was stirred to prepare the agent according to the invention.

On a concrete structure with a surface deteriorated by having left to stand at outdoor for about 10 years, the agent was applied continuously until an absorption of the agent into the structure stops and then a certain amount of the agent remains on the structure, without absorbed therein. 600 g/m² of the agent was required therefor. The structure was dried in air for 1 day. After having applied on the treated surface an acrylic emulsion paint and then sufficiently cured the same, a tension testing element was adhered on the coated surface with use of a strong adhesive and then the structure was subjected to a tension test to find that tensile strength of the resulting concrete was about 15 Kg/cm² and the depth of the disintegrated layer was 10 mm from the concrete surface.

COMPARATIVE EXAMPLE 9

A test similar to that in Example 9 was carried out, excepting that the condensate of sodium naphthalenesulfonate and formaldehyde was not added in the agent. In this case, an amount of agent permeated in the structure was 400 g/m². Tension test shows that the tensile strength is about 15 Kg/cm² but a depth of the disintegrated layer was 4 mm.

COMPARATIVE EXAMPLES 10 TO 13

A modifying agent was prepared in the manner similar to those in Examples 1 to 4, excepting that a surfactant of polyoxyethylenenonylphenol ether was used in lieu of the condensate of sodium naphthalenesulfonate and formaldehyde. The freshly prepared agent was applied on the structure as in Examples 1 to 4 to measure permeating depth. Results are shown in following Table 2.

The above agent was left to stand at 40° C. for about 2 weeks to find that the agent causes an increase in its viscosity and an isolation of components.

COMPARATIVE EXAMPLES 14 TO 17

Tests were carried out in the manner similar to those in Examples 1 to 4, excepting that a fluoro surfactant (Trade Name "EFTOP EF-112 sold by Tohoku Hiryo Kabushiki Kaisha, Japan) was used in lieu of the condensate of sodium naphthalenesulfonate and formaldehyde. Results are shown in following Table 2.

COMPARATIVE EXAMPLES 18 TO 20

Tests were carried out in the manner similar to those in Examples 1 to 4, excepting that sodium toluensulfonate solution or sulfonated melamine-formaldehyde condensate solution was used in lieu of the sodium naphthalenesulfonate-formaldehyde condensate. Results are shown in following Table 2.

TABLE 2

| Comparative Example | Alkali silicate in Agent | Surfactant | Permeated depth (mm) |
|---|---|---|---|
| 10 | lithium silicate | EOP | 2 |
| 11 | sodium silicate | " | 1 |
| 12 | tetraethanolammonium silicate | " | 1 |
| 13 | potassium silicate | " | 1 |
| 14 | lithium silicate | F | 2 |
| 15 | sodium silicate | " | 1 |
| 16 | potassium silicate | " | 1 |
| 17 | tetraethanolammonium silicate | " | 1 |
| 18 | lithium silicate | TS | 1.5 |
| 19 | lithium silicate | SMF | 1.5 |
| 20 | sodium silicate | " | 1 |

In the Table:
EOP: polyoxyethylenenonylphenol ether
F: fluoro surfactant (EFTOP EF-112)
TS: sodium toluensulfonate
SMF: sulfonated melamine-formaldehyde condensate

EXAMPLE 10

A test similar to that in Example 9 was carried out, excepting that in lieu of the acrylic emulsion paint, a mortar with sand/cement weight ratio of 2/1 and contain 7.5 weight % of SBR latex in dried content based on the cement was applied on the deteriorated structure surface in 2 mm thickness. The resulting structure was left to stand for about 1 month in atmosphere. A tension testing element was adhered on the structure surface with use of a strong adhesive and then the structure was subjected to a tension test to find that tensile strength of the resulting structure was about 15 Kg/cm$^2$ and the depth of the disintegrated layer was 10 mm from the surface of the concrete.

COMPARATIVE EXAMPLE 21

A test similar to Example 10 was carried out, excepting that the condensate of sodium naphthalenesulfonate-formaldehyde was not added to the basic agent. In this case, the tensile strength was about 15 Kg/cm$^2$ but the depth of the disintegrated layer was 4 mm from the surface of the concrete.

What we claimed is:

1. An agent for modifying a surface layer of cement structures, which comprises 100 parts by weight of an alkali silicate solution and 0.02 to 1 parts by weight of a water soluble condensate of sodium naphthalene sulfonate and formaldehyde, in which said alkali silicate solution has a SiO$_2$/M$_2$O mole ratio of 1 to 50, wherein M represents an alkali metal atom, or a substituted or unsubstituted ammonium cationic radical, and has a SiO$_2$ content of 5 to 30 weight %.

2. The agent as claimed in claim 1, wherein said alkali silicate is selected from the group consisting of silicates of lithium, potassium, sodium, methylammonium, dimethylammonium, dimethyldiethanolammonium, triethanolammonium, tetraethanolammonium, diethylammonium, ethylpropanolammonium and ethyltriethanolammonium.

3. The agent as claimed in claim 1, in which said alkali silicate solution is a lithium silicate solution, said water soluble condensate having a polymerization degree ranging from 3 to 15, in which said lithium silicate solution has SiO$_2$/M$_2$O mole ratio of 2 to 7 and has a SiO$_2$ content of 5 to 30 weight %.

4. The combination comprising a cement structure and an agent on a surface of said cement structure, said agent being disposed in a permeated condition within said surface of the cement structure to prevent determioration thereof, said agent comprising 100 parts by weight of an alkali silicate solution and 0.02 to 1 parts by weight of a water soluble condensate of sodium naphthalene sulfonate and formaldehyde, in which said alkali silicate solution has a SiO$_2$/M$_2$O mole ratio of 1 to 50, wherein M represents an alkali mehtal atom, or a substituted or nonsubstituted ammonium cationic radical, and has a SiO$_2$ content of 5 to 30 weight %.

5. The combination as claimed in claim 4, wherein said alkali silicate is selected from the group consisting of silicates of lithium, potassium, sodium, methalammonium, dimethylammonium, dimethylethanolammonium, triethanolammonium, tetraethanolammonium, diethylammonium, ethylpropanolammonium and ethyltriethanolammonium.

6. The combination as claimed in claim 4, in which said alkali silicate solution is a lithium silicate solution, said water soluble condensate having a polymerization degree ranging from 3 to 50, in which said lithium silicate solution has SiO$_2$M$_2$O mole ratio of 2 to 7 and has a SiO$_2$ content of 5 to 30 weight %.

7. The combination as claimed in claim 4, wherein said cement structure is selected from the group consisting of hardened cement, mortar, concrete and calcium silicate board.

8. The combination as claimed in claim 4, wherein said cement structure has a deteriorated surface layer into which said agent is disposed in a permeated condition.

9. An agent for modifying a surface layer of cement structures, which consists essentially of 100 parts by weight of an alkali silicate solution and 0.02 to 1 parts by weight of water soluble condensate of sodium naphthalene sulfonate and formaldehyde, in which said alkali silicate solution has a SiO$_2$/M$_2$O mole ratio of 1 to 50, wherein M represents an alkali metal atom, or a substituted or nonsubstituted ammonium cationic radical, and has a SiO$_2$ content of 5 to 30 weight %.

10. The agent as claimed in claim 9, wherein said alkali silicate is selected from the group consisting of silicates of lithium, potassium, sodium, methylammonium, dimethylammonium, dimethyldiethanolammonium, triethanolammonium, tetraethanolammonium, diethylammonium, ethylpropanolammonium and ethyltriethanolammonium.

11. The agent as claimed in claim 9, in which said alkali silicate solution is a lithium silicate solution, said water soluble condensate having a polymerization degree ranging from 3 to 50, in which said lithium silicate solution has SiO$_2$/M$_2$O mole ratio of 2 to 7 and has a SiO$_2$ content of 5 to 30 weight %.

* * * * *